Patented Jan. 12, 1954

2,665,989

UNITED STATES PATENT OFFICE 2,665,989

MILK PROTEIN FOOD PRODUCT AND PROCESS

Hartley W. Howard, Hastings-on-Hudson, and Richard J. Block, Scarsdale, N. Y., and Herbert E. Sevall, Elgin, Ill., assignors to The Borden Company, New York, N. Y., a corporation of New Jersey No Drawing. Application February 15, 1949, Serial No. 76,642

3 Claims. (Cl. 99—20)

This invention relates to foodstuffs, and in particular to a method for preparing an improved nutritional product of high protein content from milk, said product having enhanced physical and biological characteristics.

Attempts have been made in the past to produce nutritional products particularly high in protein content from lacteal starting materials, but such attempts have heretofore been unsuccessful or only partly successful. Such prior efforts have in the past resulted in the formation of insoluble or only partially soluble products which are unsatisfactory from a commercial standpoint. Moreover, such products ordinarily have a bad taste.

It was therefore a general object of the present invention to overcome the difficulties heretofore encountered in prior practices. It was a further object of the invention to provide an improved food product having a high protein content which is water soluble and bland in taste.

Other objects of the invention will in part be obvious and will in part appear hereinafter.

Accordingly, the present invention comprises a process for obtaining an improved food product from milk wherein the steps comprise heating a starting material of the class described, adding sufficient acid at elevated temperature to precipitate the proteins present in the starting material, and recovering the precipitated material. This material comprises a casein-lactalbumin co-precipitate. The product thus recovered, hereinafter referred to as the "protein complex," is found to have valuable properties in the field of nutrition and may be utilized in this form, or it may be combined or fortified with other protein substances, in particular substances of the class containing biologically labile methyl groups and/or organic substances which contain biologically available sulfur.

The invention accordingly comprises the several steps and the relation of one or more of such steps with respect to each of the others, and the product and article possessing the features, properties, and the relation of constituents, which are exemplified in the following detailed disclosure, and the scope of the invention will be indicated in the claims.

Fluid skimmed milk or skimmed milk reconstituted from dry milk powder is employed as the now preferred starting material. As the precipitating agent there may be employed an acid such as phosphoric acid, acetic acid, sulfuric acid, sulfurous acid, hydrochloric acid, lactic acid, and the like. In the now preferred embodiment hydrochloric acid is employed as the precipitating agent.

The temperature to which the starting material must be heated prior to precipitation in order to form the novel food product of the present invention is critical. It has been found that the starting material must first be brought to a temperature in the range of 85° C. to 95° C. prior to precipitation. Within this range optimum results are obtained at a temperature of approximately 90° C.

In order to effect proper precipitation of the product, i. e., the protein complex, an acid of the class described is then added while the starting material is at such temperature. Optimum precipitation of the product, when skimmed cow's milk is used as the starting material, occurs at the isoelectric point, i. e., a pH of about 4.5–4.7.

In the now preferred process embodying applicants' invention, the starting material preferably employed is fresh skimmed cow's milk. The skimmed milk is heated to a temperature of 90° C., then while the material is maintained at such temperature, a sufficient quantity of dilute hydrochloric acid is added to adjust the acidity of the hot skimmed milk to a pH of approximately 4.7. It is well known that the addition of acid to skimmed milk causes casein to precipitate. It has been discovered, however, that lactalbumin will be precipitated at this critical temperature in addition to the casein, and moreover will form a co-precipitate with the casein. The casein is present in skimmed milk in a much larger amount than lactalbumin. Thus it has been found that the casein present in the skimmed milk is made to serve as a settling agent and thus assumes the role of a filter aid in facilitating the coagulation and removal of the lactalbumin. The casein serves to aid in the separation of the lactalbumin from the skimmed milk with a minimum of heat required. Under the aforementioned conditions of temperature and acidity, the proteins obtained in the curd precipitate represent the majority of all of the proteins present in the starting material, and may be said to include substantially all of those proteins commonly designated as casein and lactalbumin.

The protein complex prepared in accordance with the process of the present invention has been found to have valuable properties as a food product, and in particular has been found to be a more desirable food supplement than a mere mixture of casein and lactalbumin, each having been isolated separately by ordinary known methods and then subsequently combined. The protein complex thus prepared has a greater nutritive value than casein alone and possesses more desirable physical properties than are associated with casein and/or lactalbumin individually obtained in accordance with the prior practices or ordinary methods.

The following example is given by way of illustrating the present invention, but it is to be understood that there may be employed variations and/or combinations thereof which are apparent from the following description.

Fresh fluid skimmed milk is heated to a temperature of 85° C. to 95° C., preferably at the optimum temperature of 90° C., as above indicated. Dilute hydrochloric acid is then added until a pH of 4.7 is obtained. The curd precipitate is then allowed to settle at this temperature and the supernatant liquid subsequently decanted or otherwise removed. The recovered curd precipitate is then washed with an excess of wash water, the pH of which is adjusted to 4.6 with hydrochloric acid, and after permitting the washed precipitate to settle for about one hour the wash liquor is then decanted. This acid wash treatment is then repeated. The precipitate is then washed a third time but this time using unacidified water, and the curd then removed from the final wash liquor preferably by centrifugation.

The protein complex thus obtained has been found to have a good protein biological value as demonstrated by actual feeding tests. If desired, the precipitated product may be dried in known manner such as by spray drying, drum drying, or the like. Alternatively, the moist curd may be redispersed prior to drying by addition of an alkaline substance such as dilute potassium hydroxide, sodium hydroxide, ammonium hydroxide, or other alkaline material, and adjusted to a pH of approximately 6.6-7.2, care being taken to avoid formation of a local excess of alkali which might damage the nutritive value of the protein, meanwhile holding the temperature to approximately 48° C. during the step of adding the alkali, and then dried in conventional manner to give a protein complex which of itself is of excellent value nutritionally, bland in taste and which has desirable physical and organoleptic properties. One of the most important of these properties is the fact that the lactalbumin produced by this method is readily dispersed in water at a pH of 6.6-7.2 so that it substantially stays in solution, whereas ordinary lactalbumin (or lactalbumin mixed with casein) at these pH ranges is entirely insoluble and if it is stirred into water, the lactalbumin comes down as a gritty sediment.

The protein complex comprising the casein-lactalbumin co-precipitate thus prepared may be employed to great advantage in admixture with other materials, in particular in combination with a quantity of undried lactalbumin, derived by ordinary methods, together with a further quantity of fresh skimmed milk. The efficacy of the protein complex produced as hereinabove described may be still further enhanced by the addition of other substances, in particular a substance which contains a labile methyl group and/or an organic substance which contains biologically available sulfur.

In a now preferred practice for utilizing the protein complex derived in accordance with the present invention, there is added a quantity of moist lactalbumin which has been prepared in a conventional manner, such as by heating fresh whey to precipitate the lactalbumin. The moist lactalbumin is preferably added to the protein complex while still moist, i. e., prior to drying. There is then added to this mass a quantity of fresh skimmed milk, the preferred proportion of protein complex:lactalbumin curd:fresh skimmed milk being in the ratio of 65-75:6-8:18-22 parts by weight on a dry weight basis.

The moist mass is thoroughly comminuted, then homogenized. The pH of the homogenized material is then adjusted to about 6.7-7.2, preferably 7.0, by addition of a sufficient quantity of dilute potassium hydroxide, ammonium hydroxide, or other alkaline material. The mixture is continuously stirred during addition of the alkali, care being taken to avoid the creation of a local excess of alkali during the addition step and which might tend to damage the nutritive value of the protein. The temperature of the mass is preferably held at approximately 48° C. during the addition of the alkali and held at that temperature over the period during which the alkali is added, but other temperatures may be employed. For example, at temperatures substantially higher than 48° C. there is the danger of overheating the protein and therefore causing partial destruction, which should be avoided. It has also been observed that at a temperature of approximately 48° C. the dispersion of the various proteins is facilitated and best results have therefore been obtained at that temperature.

After the alkaline material is added, the mass may be dried to yield a novel composition comprising a readily dispersible protein product or supplement possessing very high biological value. It has also been found that the biological value of this product is greater than any one of the protein components comprising it. It has also been found that the protein efficiency of this composition may be still further enhanced by the addition of a substance containing a labile methyl group and/or an organic substance containing biologically available sulfur. For example, as the source of the organic sulfur there may preferably be added to the composition a compound such as cystine, methionine, homocystine, cysteine, homocysteine; beta thiol pyruvic acid; the simple peptides of cystine, cysteine, and methionine; and the like. In a now preferred embodiment as the source of the organic substance containing biologically available sulfur there is employed a sulfur-containing amino acid. There may also be added a substance containing a source of labile methyl groups such, for example, as choline, betaine, methionine, lecithin, and simple derivatives of these compounds having a labile methyl group present. The total amount of such substances comprising those containing available sulfur and/or those containing a labile methyl group is approximately 1% of the composite mass on a dry weight basis.

The expression "labile methyl group" as used herein is employed in the sense as used in an article entitled "Migration of the Methyl Group in the Body" by Vincent du Vigneaud, Proc. Am. Phil. Soc., Vol. 92, No. 3, July 1948, pages 129-135, see page 134. The term "substance containing biologically available sulfur" as used herein is meant to include those compounds which contain sulfur in such a form that an animal organism can convert them into the cystine and methionine portions of a tissue protein.

The whole mixture is then preferably comminuted and thereafter homogenized, and finally pasteurized and then dried as by spray drying, vacuum roller drying, and the like. Such method of drying is preferably one which does not render the protein materials insoluble through the application of excessive heat. Prior to the homogenizing step there may be added various assistants which improve the wetting and dispersing characteristics of the final products, such, for example, as lecithin, sorbitol, glycerine, and the like.

The proportions of the various ingredients given above are illustrative only, and the general composition may be represented as falling within the range indicated in the following analytical table:

Table I

| Composition: | Per cent by weight |
| --- | --- |
| Moisture | 2–10 |
| Protein (N × 6.25) | 65–75 |
| Carbohydrate | 5–10 |
| Ash: less than | 4–9 |
| Amino acids: (g. per 16.0 g. of nitrogen) | |
| Lysine grams | 7.5–8.5 |
| Tryptophane do | 1.2–1.4 |
| S-amino acids and labile methyl groups grams | 6.0–6.8 |

It is obvious that variations may be made in the proportions given in the present specification within the limits indicated by the analytical data given in Table I.

The following example is given by way of illustrating a preferred method of making a composition containing the various ingredients of the present invention, but not by way of limiting the invention. Unless otherwise stated, all parts are given in parts by weight.

Example I 12,600 pounds of fresh fluid skimmed milk were heated to 90° C. in a heat exchanger then collected in tanks and adjusted at this temperature to pH 4.7 with dilute hydrochloric acid. The supernatant liquid was decanted. A water wash was adjusted with hydrochloric acid to pH 4.6, mixed thoroughly into the precipitate and after settling one hour the wash liquid was decanted. The acid wash was repeated and followed by an unacidified water wash after which the washed curd was centrifuged. To the washed curd there were added 160 pounds of moist lactalbumin curd, prepared in the conventional manner from fresh cheese whey, together with 1185 pounds of skimmed milk and 600 pounds of water. The several ingredients were agitated to insure thorough mixing. The mass was run through a comminuter (20 mesh screen) and then through a homogenizer, after which it was run into a vessel where 141 pounds of 4% potassium hydroxide were added slowly to attain a pH of 7.0. During adjustment of the pH the temperature was held at 48° C. and stirring was continuous. 3.6 pounds of cystine and 1.4 pounds of choline chloride were then added. The material was again passed through the comminuter (60 mesh screen) and again homogenized. The product was then spray-dried in conventional manner.

As above indicated, the products obtained by the methods stated hereinabove have a protein biological value greater than any of the individual ingredients making up the combination. For example, the biological value of the protein product prepared in accordance with Example I exceeds that of milk protein and also that of the principal proteins of milk, namely, casein and lactalbumin, singly or in combination. It is thus apparent that the product obtained in accordance with the process of this invention has a greater nutritional value than would be anticipated or realized by an examination or use of its individual component parts.

Since certain changes in carrying out the above process and certain modifications in the composition which embodies the invention may be made without departing from its scope, it is intended that all matter contained in the foregoing description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In precipitating casein and lactalbumin in water redispersible form from skimmed milk, the method which comprises heating the milk and maintaining it at all times at a pH above the isoelectric point for casein and above the pH at which casein precipitates until the temperature comes to be within the range 85°–95° C., whereby precipitation of casein and lactalbumin are avoided, then adding an acid in amount to establish the pH of the heated milk at approximately the isoelectric point for casein while maintaining the temperature within the said range, the casein and lactalbumin being thus precipitated at the same time, and then separating the casein and lactalbumin so precipitated from the remaining liquid, both the casein and the lactalbumin so obtained being readily dispersible in water at approximate neutrality.

2. The method of claim 1 in which the precipitated and separated casein and lactalbumin are suspended in aqueous liquid, alkali added to establish the pH of the suspension within the range 6.7–7.2, and the dispersion so made is subjected to elevated temperature to cause drying.

3. A food comprising a mixture of casein and lactalbumin characterized by dispersibility of the casein and the lactalbumin in water at approximate neutrality, the food being the product prepared by the method of claim 1.

HARTLEY W. HOWARD.
RICHARD J. BLOCK.
HERBERT E. SEVALL.

References Cited in the file of this patent

In re Hauser et al., 76 U. S. P. Q. 614.
Levin v. Coe, 545 O. G. 677.
Richter's Organic Chemistry, vol. I, 2nd ed. (English), 1919. Published by P. Blakiston's Son & Co., Philadelphia, U. S. A., p. 387.
Rogers, Associates of "Fundamentals of Dairy Science," pub. 1928 by the Chemical Catalog Co. Inc., N. Y., pp. 53, 46, 48, 51, 44.
Whitmore, F. C., "Organic Chemistry," 3rd printing Aug. 1938, pub. by D. Van Nostrand Co., Inc., N. Y., pp. 600, 598, 599, 603, 504, 505, 506.
Hunziker, O. F., "Condensed Milk and Milk Powder," pub. 1946 by La Grange, Illinois, 6th ed., pp. 1, 17, 192, 240, 254, 383, 384, 465.
Journal of Nutrition, vol. 31, Issue 4, pp. 485–495, pub. Apr. 10, 1946.
Bailey, A. E., "Cottonseed and Cottonseed Products," pub. by Interscience Publishers, Inc., N. Y., pp. 489, 773, 425.